United States Patent [19]

Asayama

[11] Patent Number: 5,113,822

[45] Date of Patent: May 19, 1992

[54] THROTTLE VALVE CONTROL APPARATUS FOR AN INTERNAL COMBUSTION ENGINE

[75] Inventor: Yoshiaki Asayama, Himeji, Japan

[73] Assignee: Mitsubishi Denki K.K., Tokyo, Japan

[21] Appl. No.: 555,008

[22] Filed: Jul. 20, 1990

[30] Foreign Application Priority Data

Aug. 29, 1989 [JP] Japan .................... 1-222216

[51] Int. Cl.⁵ .................... F02D 11/08; F02D 11/10
[52] U.S. Cl. .................... 123/360; 123/361; 123/399
[58] Field of Search ............ 123/340, 361, 396, 399, 123/400, 403, 360

[56] References Cited

U.S. PATENT DOCUMENTS

| | | | |
|---|---|---|---|
| 3,661,131 | 5/1972 | Croft | 123/360 |
| 3,964,457 | 6/1976 | Cosia | 123/361 |
| 4,337,743 | 7/1982 | Mattson | 123/396 |
| 4,342,299 | 8/1982 | Haka | 123/396 |
| 4,392,502 | 7/1983 | Weston | 123/396 |
| 4,462,355 | 7/1984 | Ozaki et al. | 123/399 |
| 4,548,176 | 10/1985 | Ishida et al. | 123/396 |
| 4,727,840 | 3/1988 | Nishida et al. | 123/399 |
| 4,768,483 | 9/1988 | Asayama | 123/399 |
| 4,785,782 | 11/1988 | Tanaka et al. | 123/361 |
| 4,838,226 | 6/1989 | Matsuzawa et al. | 123/399 |
| 4,856,476 | 8/1989 | Shirakawa | 123/399 |
| 4,969,437 | 11/1990 | Kolb | 123/340 |
| 5,018,496 | 5/1991 | Buchl | 123/361 |
| 5,022,369 | 6/1991 | Terazawa | 123/361 |

FOREIGN PATENT DOCUMENTS 0084828  6/1980  Japan .................... 123/399

Primary Examiner—Tony M. Argenbright
Attorney, Agent, or Firm—Sughrue, Mion, Zinn Macpeak & Seas

[57] ABSTRACT

A throttle valve control apparatus for an internal combustion engine, which is high in driving safety, enabling the vehicle to cruise in an automatic manner while preventing a run-away condition of the vehicle includes a throttle valve in an intake pipe of the engine fixedly mounted on a valve shaft which is rotatably supported by the intake pipe, and a rotary disk rotatably mounted on the valve shaft and biased by a return spring to rotate relative to the valve shaft in the valve closing direction. The rotary disk is operatively connected with the accelerator pedal so that the rotary disk rotates relative to the valve shaft by operation of the accelerator pedal. A rotation-transmitting mechanism is connected between the rotary disk and the throttle lever for transmitting the rotation of the rotary disk to the throttle lever. A first actuator such as a vacuum actuator is operatively connected with the accelerator pedal for operating the accelerator pedal, independently of the driver to rotate the rotary disk in the valve-opening direction. A second actuator such as an electric motor is operatively coupled with the throttle lever through a power transmission mechanism for driving the throttle lever to rotate the valve shaft and close the throttle valve. A rotation limiter is provided for limiting the rotation of the valve shaft caused by the second actuator to a prescribed range defined by the operation of the accelerator pedal by the driver or the first actuator.

15 Claims, 2 Drawing Sheets

THROTTLE VALVE CONTROL APPARATUS FOR AN INTERNAL COMBUSTION ENGINE

BACKGROUND OF THE INVENTION

The present invention relates to a throttle value control apparatus for an internal combustion engine which controls the opening of a throttle valve through the action of an electronically controlled actuator.

In recent years, many throttle valve control apparatuses having electronically controlled actuators have been developed for the purpose of improving the driving feeling and running performance of a vehicle. A conventional mechanical linkage connected between an accelerator pedal and a throttle valve through a wire cable is replaced by a system having an electronically controlled actuator interposed between the accelerator pedal and the throttle value for controlling the throttle valve based on the engine operating conditions and the running conditions of a vehicle in addition to the operational quantity of the accelerator pedal imparted by the driver.

With this type of throttle value control apparatus equipped with an electronically controlled actuator, however, the throttle valve is controlled to open and close by the actuator in the form of an electric motor which is in turn controlled by control commands from a vehicle control unit including a calculation and control section which operates to successively calculate an optimal degree of opening for the throttle valve in response to signals representative of the engine operating conditions, the running conditions of the vehicle and the like. As a result, in order to ensure safety in driving, it is necessary to provide a fail-safe means for preventing run-away of the vehicle during the time when the electronically controlled actuator fails. A typical example of such a fail-safe means is known from Japanese Patent Publication No. 61-54933 in which a throttle valve, which is controllably driven by an electrically operated actuator, and another safety throttle valve operatively connected with an accelerator pedal are disposed in the intake pipe of the engine in a serial relation with each other. Also, another typical example is shown in Japanese Patent Laid-Open No. 61-60331 in which a first throttle valve, which is operatively connected with an accelerator pedal, and a second throttle valve, which is controllably driven by an electric motor, are disposed in the intake pipe of the engine in a serial relation with each other so as to control the slip rate of the road wheels of a vehicle.

However, the conventional throttle valve control apparatuses as constructed above have the following disadvantages. Namely, with the above conventional throttle valve control apparatuses in which the two throttle valves one being operatively connected with the accelerator pedal and the other being controlled by the electically controlled actuator, are serially disposed in the intake pipe, it is possible to prevent run-away of the vehicle by controlling the one of the throttle valves operatively connected with the accelerator pedal upon failure of the electronically operated actuator, but the serial disposition of the two throttle valves necessarily results in an enlargement of the entire apparatus, creating difficulty in installing the apparatus inside an engine compartment which is ordinarily limited in space. Further, there is another problem that it is impossible to make the vehicle run in an automatic manner without any accelerator pedal operation by the driver as in the case of cruise control in which the vehicle is automatically run at a present constant speed.

SUMMARY OF THE INVENTION

Accordingly, the present invention is intended to obviate the the above-described problems of the conventional throttle valve control apparatus.

It is an object of the present invention to provide a novel and improved throttle valve control apparatus for an internal combustion engine which is simple in construction and compart in size with the provision of a signal throttle valve.

Another object of the present invention is to provide a throttle valve control apparatus for an internal combustion engine which is able to prevent run-away of the vehicle, and thus provides high driving safety.

A further object of the present invention is to provide a throttle valve control apparatus for an internal combustion engine which enables the vehicle to run in an automatic manner under the control of an electronically controlled actuator, which controls the opening of the throttle valve, when the driver turns on an automatic operation switch such as a cruise control switch.

In order to achieve the above objects, according to one aspect of the present invention, there is provided a throttle valve control apparatus for an internal combustion engine having a throttle valve which is disposed in an intake pipe and connected with an accelerator pedal for controlling the quantity of intake air sucked into the engine through the intake pipe in accordance with the operation of the accelerator pedal by the driver, the throttle valve control apparatus comprising:

a valve shaft fixedly mounting thereon the throttle valve and being rotatably supported by the intake pipe;

a first actuator operatively connected with the valve shaft for driving the valve shaft to rotate in a direction to open the throttle valve; and a second actuator operatively connected with the valve shaft for driving the valve shaft to rotate in a direction to open the throttle valve.

According to another aspect of the present invention, there is provided a throttle valve control apparatus for an internal combustion having a throttle valve disposed in an intake pipe and connected with an accelerator pedal for controlling the quantity of intake air sucked into the engine through the intake pipe in accordance with the operation of the accelerator pedal by the driver, the throttle valve control apparatus comprising:

a valve shaft fixedly mounting thereon the throttle valve and being rotatably supported by the intake pipe;

a rotary disk rotatably mounted on the valve shaft and operatively connected with the accelerator pedal in such a manner that the rotary is caused to rotate relative to the valve shaft by operation of the accelerator pedal;

first biasing means for biasing the rotary disk to rotate relative to the valve shaft in the valve-closing direction;

a rotation transmitting mechanism connected between the rotary disk and the throttle lever for transmitting the rotation of the rotary disk to the throttle lever;

a first actuator operatively connected with the accelerator pedal for operating the accelerator pedal, independently of the driver's operation on the accelerator pedal, so as to rotate the rotary disk in a direction to move the valve shaft in the valve-opening direction; and a second actuator operatively connected with the throttle lever through a power transmission mechanism for driving the throttle lever so as to rotate the valve shaft in a direction to close the throttle valve.

Preferably, a rotation-limiting means is provided for limiting the rotation of the valve shaft caused by the second actuator to a prescribed rotational range which is defined by the operation of the accelerator pedal by the driver or the first actuator. An example of such a rotation-transmitting mechanism comprises: a first link member having a basal end rotatably connected with the rotary disk and a distal end; and a second link member having one end rotatably connected with the distal end of the first link member and the other end rotatably connected with the throttle lever, whereby the rotation of the rotary disk is transmitted to the throttle lever through the first link member and the second link member.

It is preferable that the power transmission mechanism for transmitting power from the second actuator to the throttle lever comprise; a drive gear wheel operatively connected with the second actuator; and a driven gear wheel integrally formed with the first link member and being in meshing engagement with the drive gear wheel. The driven gear wheel is a sector shaped gear wheel having a radius larger than that of the driver gear wheel. The sector shaped gear wheel has a radial extension with which the one end of the second link member is rotatably connected.

Preferably, the throttle lever has a generally round configuration having a radial extension with which the other end of the second link member is rotatably connected.

Preferably, the rotation limiting means comprises: one of the throttle lever and the rotary disk having a rotation-limiting slot formed therein, the slot having a pair of stop-edges circumferentially spaced from each other; and a stop pin having a basal end fixedly secured to the other of the throttle lever and the rotary disk and a distal end extending therefrom into the rotation-limiting slot. The stop pin is abuttingly engageable with the stop edges of the rotation-limiting slot so as to define the prescribed rotational range of the throttle valve when the second actuator operates to drive the throttle lever to rotate in the valve opening direction. A second biasing means is provided for biasing the throttle lever in the valve opening direction so that the stop pin is brought into abutting engagement with one of the stop edges of the rotation-limiting slot.

Preferably, the first actuator is a vacuum actuator, and the second actuator is an electric motor.

The above and other objects, features and advantages of the present invention will become more readily apparent from the following detailed description of a preferred embodiment of the invention taken in conjunction with the accompaying drawings.

DESCRIPTION OF THE PREFERRED EMBODIMENT

The present invention will now be described in detail with reference to a preferred embodiment as illustrated in the accompanying drawings.

Figure 1:
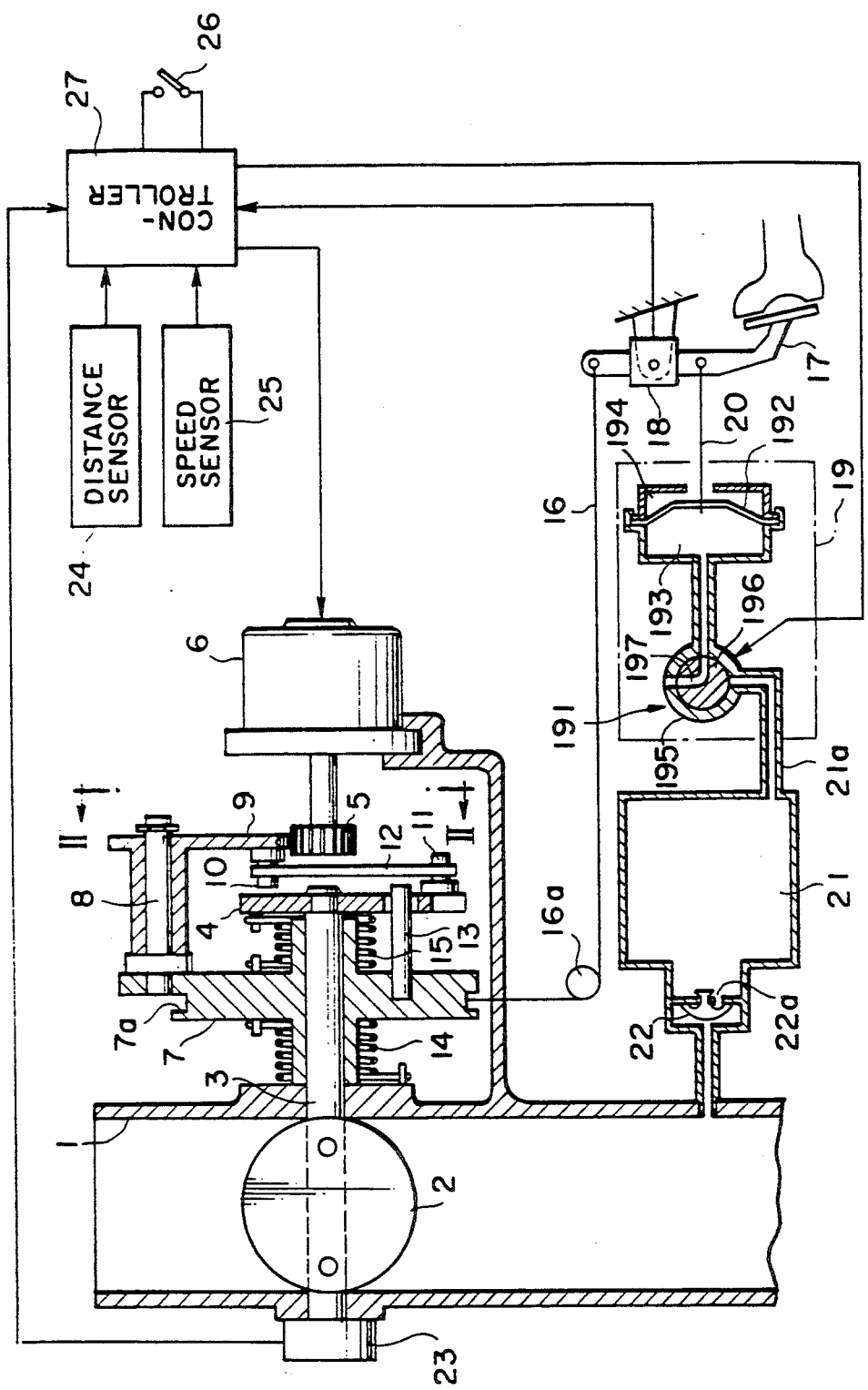
FIG. 1 is a schematic illustration showing the general construction of a throttle valve control apparatus for an internal combustion engine in accordance with the present invention.

Referring to the drawings and first to FIG. 1, there is shown a throttle valve control apparatus for an internal combustion engine constructed in accordance with the principles of the present invention. In FIG. 1, the throttle valve control apparatus illustrated is applied to a cruise control system which is equipped with a vehicle distance sensor for sensing the intervehicle distance between the specific vehicle and the preceding vehicle, and which operates to automatically adjust the opening degree of a throttle valve so as to maintain the speed of the vehicle at a present constant level, but readjust, in the presence of a preceding vehicle, the throttle opening so as to maintain a prescribed proper distance therebetween.

In FIG. 1, there is shown an intake pipe 1 of an unillustrated internal combustion engine, which is installed on a vehicle, for introducing intake air into the engine. A throttle valve 2 is disposed in the intake pipe 1 for controlling the amount of intake air to be sucked into the engine and fixedly mounted on a valve shaft 3 which is rotatably supported on the opposite sides thereof by the cylindrical wall of the intake pipe 1. The valve shaft 3 has an extension at one side to the extended end of which a throttle lever 4 is fixedly secured. The thottle lever 4 has a substantially circular body and a radial extension intergrally formed therewith. A drive gear wheel 5, which is disposed in alignment with the valve shaft 3 with a space formed therebetween, is connected with the rotary shaft of an electric motor 6 so as to be driven to rotate.

A rotary disk 7 is mounted on the valve shaft 3 for rotation relative thereto and has an annular groove 7a formed on the circumferential outer periphery thereof. A gear shaft 8 is fixedly secured to one side surface of the rotary disk 7 at a radial extension thereof and projects therefrom substantially in parallel to the valve shaft 3. Rotatably mounted on the gear shaft 8 ia a driven or reduction gear wheel 9 in the shape of a sector which is in meshing engagement with the drive gear wheel 5. The sector-shaped reduction gear wheel 9 has a radius greater than that of the drive gear wheel 5. The sector-shaped reduction gear wheel 9 is operatively connected with the throttle lever 4 through an elongated link plate 12 which is rotatably connected at one end with the radial extension of the reduction gear wheel 9 via a connection pin 10 and at the other end with the radial extension of the throttle lever 4 via a connection pin 11. Thus, the throttle lever 4 with its radial extension, the reduction gear wheel 9 with its radial extension, and the elongated link plate 12 together constitute a kind of parallel motion mechanism so that when the reduction gear wheel 9 is caused to rotate around the gear shaft 8 by the drive gear wheel 5, the throttle lever 4 is rotated by the reduction gear wheel 9 through the link plate 12 in the same rotational direction. As clearly shown in FIG. 2, the throttle lever 4 has an arcuate-shaped rotation-limiting slot 4a with a pair of circumferentially spaced stop edges, the slot 4a circumferentially extending substantially an angle of 90 degrees around the axis of the throttle lever 4. A stop pin 13, which is fixedly secured to or implanted into the rotary plate 7, extends from the side surface thereof in parallel with the valve shaft 3 into the rotation-limiting slot 4a so that when the throttle lever 4 rotates relative to the rotary disk 7, the stop pin 13 is abuttingly engageable with the arcuate slot 4a at one or the other circumferential edge thereof so as to limit the rotational range of the throttle lever 4.

A first return spring 14 is disposed around a first cylindrical sleeve portion of the rotary disk 7 surrounding the valve shaft 3 between the outer side surface of the intake pipe 1 and the opposed side surface of the rotary disk 7. The first return spring 14 is connected at one end with the intake pipe 1 and at the other end with the rotary disk 7 for imparting a biasing force or torque to the valve shaft 3 via the rotary disk 7, the stop pin 13 and the throttle lever 4 in a direction to return the throttle valve 2 to the closed position (i.e., in the counterclockwise direction as indicated by arrow A in FIG. 2).

A second return spring 15 is also disposed around a second cylindrical sleeve portion of the rotary disk 7 surrounding the valve shaft 3 between the rotary disk 7 and the throttle lever 4. The second return spring 15 is connected at one end with the rotary disk 7 and at the other end with the throttle lever 4 for biasing the throttle lever 4 in a direction to abut against the stop pin 13 (i.e., in a direction opposite to the direction indicated by arrow A).

The rotary disk 7 disk operatively connected with an accelerator pedal 17 through an acceleration wire 16 which has one end connected with and entrained around the annular groove 7a in the circumferential outer periphery of the rotary disk 7, and the other end connected with the accelerator pedal 17. A tension roller 16a is provided between the rotary disk 7 and the accelerator pedal 17 for tensioning the acceleration wire 16. An accelerator pedal sensor 18 is provided for sensing the depression quantity of the accelerator pedal 17 applied by the driver's foot.

Operatively connected with the accelerator pedal 17 through a flexible connection means 20 in the form of an operation wire is a first actuator in the form of a vacuum actuator, which is generally designated by reference numeral 19, for operating the accelerator pedal 17 independently of the driver's foot operation thereon. The vaccum actuator 19 includes a vacuum casing 190, a diaphragm 192 operatively connected with the accelerator pedal 17 through the operation wire 20 and dividing the interior of the vacuum casing 190 into a vacuum chamber 193 connected via a vacuum supply conduit 21a with a vacuum source 21 in the form of a vacuum tank and an atmospheric chamber 194 communicating with the ambient atmosphere, and a switching valve 191 in the form of an electromagnetic valve disposed on the vacuum supply conduit 21a for selectively communicating the vacuum chamber 193 with the vacuum source 21 and the ambient atmosphere. The electromagnetic valve 191 includes a spherical valve housing 195, and a spherical-shaped rotary valve body 196 rotatably received in the spherical valve housing 195 and having an L-shaped internal flow passage 197 formed therein. When the electromagnetic valve 191 is energized, the rotary valve body 196 is rotated relative to the spherical valve housing 195 to a first position in which the vacuum chamber 193 is placed in communication with the vacuum source 21 through the L-shaped internal flow passage 197 in the rotary valve body 196, whereas the rotary valve body 196 is rotated, upon de-energization of the electromagnetic valve 191, to a second position in which the vacuum chamber 193 is placed into communication with the atmosphere through the L-shaped internal flow passage 197. The vacuum tank 21 is in communication via a check valve 22 with the interior of the intake pipe 1 at a location downstream of the throttle valve 2 so as to introduce the vacuum in the intake pipe 1 into the vacuum tank 21, i.e., to allow air in the vacuum tank 21 to flow through a communication aperture 22a in a partition into the intake pipe 1 under the action of intake vacuum therein. When the pressure in the intake passage 1 becomes higher than that in the vacuum tank 21, the check valve 22 is moved under the pressure differential therebetween to close the communication aperture 22a, blocking the communication between the vaccum tank 21 and the interior of the intake pipe 1. Thus, the vacuum tank 21 serves to store the vacuum therein which is generated in the intake pipe 1. When vacuum is introduced from the vacuum source 21 to the vacuum chamber 193 of the vacuum actuator 19, the diaphragm 192 is moved under vacuum to the left in FIG. 1 so as to pull the accelerator pedal 17 through the operation wire 20 whereby the accelerator pedal 17 is rotated in the clockwise direction around its fulcrum in FIG. 2 as in the case of depression of the accelerator pedal 17 by the driver, thus driving the throttle valve 2 in the opening direction.

Further, provisions are made for various sensor means for sensing various operating conditions of the engine, the running conditions of the vehicle, etc. The sensor means includes a throttle sensor 23 for sensing the opening degree of the throttle valve 2, a distance sensor 24 such as, for example, a radar device for sensing the distance between the specific vehicle and the preceding vehicle, and a speed sensor 25 for sensing the speed for the vehicle. An automatic drive control switch or cruise control switch 26 is provided for controlling the vehicle to cruise at a preset constant speed in an automatic fashion without the driver's foot operation on the accelerator pedal 17.

An electronic controller 27 receives the output signals from the various sensors 18, and 23 through 26, performs, based on these signals, operational calculations which are predetermined in correspondence to the respective signals, and controls the electric motor 6 and the electromagnetic valve 191 of the vacuum actuator 19 in an appropriate manner.

The operation of the above-described embodiment will now be described. First, during the normal or ordinary operation of the vehicle in which the cruise control switch 26 is off, when the accelerator pedal 17 is depressed by the driver, the rotary disk 7, which is mechanically connected with the accelerator pedal 17 through the acceleration wire 16, is caused to rotate in the clockwise direction in FIG. 2 against the biasing force of the first return spring 14, whereby the valve shaft 3 is rotated in the same direction through the parallel motion mechanism, which is constituted by the reduction gear wheel 9 with its radial extension, the link plate 12, and the throttle lever 4 with its radial extension. Thus, the throttle valve 2 is rotated in the opening direction in accordance with the depression of the accelerator pedal 17 by the driver, as in a conventional throttle valve control apparatus. On the other hand, as the driver releases his or her foot form the accelerator pedal 17, the rotary disk 7 is caused to rotate in the counterclockwise direction in FIG. 2 under the bias of the return spring 14, thereby moving the valve shaft 3 and hence the throttle valve 2 in the closing direction through the parallel motion mechanism. In this case, the electromagnetic valve 191 is in the de-energized state so that the vacuum chamber 193 of the vacuum actuator 19 is held in communication with the atmosphere through the communication passage 197 in the rotary valve body 196. As a result, there is no build up of vacuum in the vacuum chamber 193 acting on the diaphragm 192, so the diaphragm exerts no pulling force on the accelerator pedal 17.

On the other hand, for the purpose of making the vehicle travel or cruise at a constant target speed, say 100 Km/h, the driver operates to properly control the accelerator pedal 17 so as cause the vehicle speed to become equal to the desired target speed, and then turns on the curise control switch (or speed setting switch) 26. As a result, the electromagnetic valve 191 is energized so that the rotary valve body 196 is rotated relative to the spherical valve housing 195 to the first position in which the communication passage 197 in the rotary valve body 196 establishes communication between the vacuum chamber 193 and the vacuum tank 21. Therefore, vacuum is introduced from the vacuum tank 21 into the vacuum chamber 193 through the communication passage 197 whereby the diaphragm 192 is moved under vacuum to the left in FIG. 1, pulling the accelerator pedal 17 in the same direction, i.e., rotating it around its fulcrum in the clockwise direction in FIG. 2 independently of driver's accelerator pedal operation. Thus, the throttle valve 2 is moved to the fully open position. Thereafter, the electronic controller 27 receives the output signal from the speed sensor 25 representative of the measured speed of the vehicle, and controls the electric motor 25 so as to make the vehicle speed equal to the desired target speed. Specifically, the electric motor 6 rotates the sector-shaped reduction gear wheel 9 in the counterclockwise direction, as indicated by arrow B in FIG. 2, through the intermediary of the drive gear wheel 5, which is in mesh with the reduction gear wheel 9. The counterclockwise rotation of the reduction gear wheel 9 is transmitted to the throttle lever 4 through the link plate 12 and rotates it in the same direction, as shown by arrow A in FIG. 2, against the biasing force of the second return spring 15, thus driving, via the valve shaft 3, the throttle valve 2 in the closing direction to such a position as to attain the target speed. During such cruise control operation, if it is detected by the distance sensor 24 that the distance between the vehicle and a preceding vehicle becomes shorter than a prescribed level, the electronic controller 27 operates to control the electric motor 6 in such a manner as to move the throttle valve 2 in the closing direction irrespective of the target speed. As a result, the vehicle is decelerated until a predetermined distance is recovered against the preceding vehicle. Thereafter, the controller 27 controls the motor 6 and/or the electromagnetic valve 191 so that the throttle valve 2 is again moved in the opening direction so as to increase the vehicle speed to the target value and then enable the vehicle to resume cruising at the constant speed.

Now, let us consider the case where the controller 27 detects from the output signal of the throttle sensor 23 the occurrence of a malfunction that the controller 27 is unable to properly control the throttle valve 2 in accordance with the output signal thereof due to a failure in the electric motor 6, a failure in the power transmission between the drive and the reduction gear wheels 5 and 9 due to something getting inbetween, or the like. In this case, immediately upon detection of such a malfunction, the controller 27 turns off the electromagnetic valve 191 so as to bring the vacuum chamber 193 of the vacuum actuator 19 into communication with the atmosphere. Simultaneous with this, the controller 27 deenergizes the electric motor 6, releasing the cruise control and returning the vehicle to the normal or manual operation mode in which the throttle valve 2 is manually operated to open and close in accordance with the driver's foot operation on the accelerator pedal 17 through the acceleration wire 16.

Figure 2:
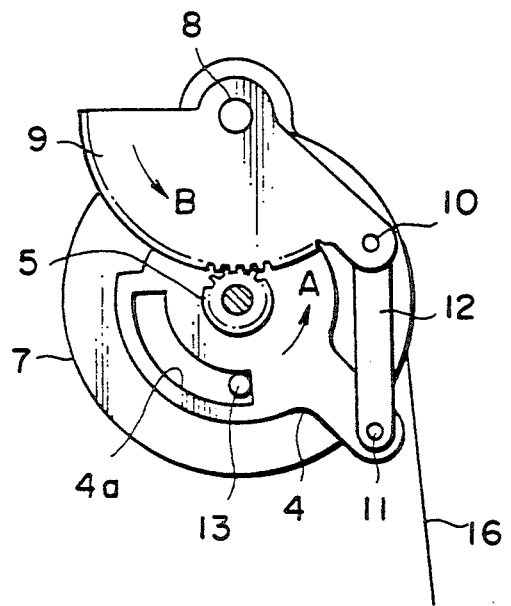
FIG. 2 is a cross section taken along the line II—II of FIG. 1.

Here, it is to be noted that the rotation of the throttle lever 4 in the clockwise direction in FIG. 2 caused by the electric motor 6 is limited by engagement of the stop pin 13 with one end edge of the arcuate slot 4a in the throttle lever 4, so the maximum opening degree of the throttle valve 2 caused by the electric motor 6 is limited to a value which is defined by the rotational position of the throttle lever 4 due to the operation of the driver or the vacuum actuator 19 on the accelerator pedal 17. Therefore, even in case of failure in the electric motor 6, there is no possibility of the throttle valve 2 being moved to a degree of opening in excess of the above limit, thus avoiding a run-away condition of the vehicle.

What is claimed is:

1. A throttle valve control apparatus for an internal combustion engine having a throttle valve disposed in an intake pipe and connected with an accelerator pedal for controlling the quantity of intake air sucked into the engine through said intake pipe in accordance with the operation of said accelerator pedal by the driver, said throttle valve control apparatus comprising:

a valve shaft fixedly mounting thereon said throttle valve and being rotatably supported by said intake pipe;

first actuator means operatively connected with a first end of said valve shaft for driving said valve shaft to rotate in a direction to open said throttle valve; and second actuator means operatively coupled with and disposed opposing said first end of said valve shaft for driving said valve shaft to rotate in a direction to open said throttle valve.

2. A throttle valve control apparatus for an internal combustion engine as claimed in claim 1, further comprising a rotation-limiting means for limiting the rotation of said valve shaft caused by said second actuator means to a prescribed rotational range.

3. A throttle valve control apparatus for an internal combustion engine as claimed in claim 1, wherein said first actuator means further comprises a vacuum actuator.

4. A throttle valve control apparatus for an internal combustion engine as claimed in claim 1, wherein said second actuator means further comprises an electric motor.

5. A throttle valve control apparatus for an internal combustion engine having a throttle valve disposed in an intake pipe and connected with an accelerator pedal for controlling the quantity of intake air sucked into the engine through said intake pipe in accordance with the operation of said accelerator pedal by the driver, said throttle valve control apparatus comprising:

a valve shaft fixedly mounting thereon said throttle valve and being rotatably supported by said intake pipe;

a rotary disk rotatably mounted on said valve shaft and operatively connected with said accelerator pedal in such a manner that said rotary disk is caused to rotate relative to said valve shaft by the operation of said accelerator pedal;

first biasing means for biasing said rotary disk to rotate relative to said valve shaft in the valve-closing direction;

rotation transmitting means connected between said rotary disk and a throttle lever for transmitting the rotation of said rotary disk to said throttle lever;

a first actuator operatively connected with said accelerator pedal for operating said accelerator pedal, independently of the driver's operation on said accelerator pedal, so as to rotate said rotary disk in a direction to move said valve shaft in the valve-opening direction; and a second actuator operatively connected with said throttle lever through power transmission means for driving said throttle lever so as to rotate said valve shaft in a direction to close said throttle valve.

6. A throttle valve control apparatus for an internal combustion engine as claimed in claim 5, further comprising a rotation-limiting means for limiting the rotation of said valve shaft caused by said second actuator to a prescribed rotational range which is defined by the operation of said accelerator pedal by one of the driver and said first actuator.

7. A throttle valve control apparatus for an internal combustion engine as claimed in claim 5, wherein said rotation transmitting means comprises:

a first link member having a basal end rotatably connected with said rotary disk and a distal end; and a second link member having one end rotatably connected with the distal end of said first link member and the other end rotatably connected with said throttle lever, whereby the rotation of said rotary disk is transmitted to said throttle lever through said first link member and said second link member.

8. A throttle valve control apparatus for an internal combustion engine as claimed in claim 7, wherein said power transmission mmeans for transmitting power from said second actuator to said throttle lever comprises:

a drive gear wheel operatively connected with said second actuator; and a driven gear wheel integrally formed with said first link member and being in meshing engagement with said drive gear wheel.

9. A throttle valve control apparatus for an internal combustion engine as claimed in claim 8, wherein said driven gear wheel is a sector shaped gear wheel having a radius larger than that of said drive gear wheel.

10. A throttle valve control apparatus for an internal combustion engine as claimed in claim 9, wherein said sector shaped gear wheel has a radial extension with which the one end of said second link member is rotatably connected.

11. A throttle valve control apparatus for an internal combustion engine as claimed in claim 10, wherein said throttle lever has a generally round configuration having a radial extension with the other end of said second link member is rotatably connected.

12. A throttle valve control apparatus for an internal combustion engine as claimed in claim 6, wherein said rotation limiting means comprises:

one of said throttle lever and said rotary disk having a rotation-limiting slot formed therein, said slot having a pair of stop edges circumferentially spaced from each other; and a stop pin having a basal end fixedly secured to the other of said throttle lever and said rotary disk and a distal end extending therefrom into said rotation-limiting slot, said stop pin being abuttingly engageable with the stop edges of said rotation-limiting slot so as to define said prescribed rotational range of said throttle valve when said second actuator operates to drive said throttle lever to rotate in the valve opening direction.

13. A throttle valve control apparatus for an internal combustion engine as claimed in claim 12, wherein said rotation-limiting means further comprises a second biasing means for biasing said throttle lever in the valve opening direction so that said stop pin is brought into abutting engagement with one of the stop edges of said rotation-limiting slot.

14. A throttle valve control apparatus for an internal combustion engine as claimed in claim 5, wherein said first actuator is a vacuum actuator.

15. A throttle valve control apparatus for an internal combustion engine as claimed in claim 5, wherein said second actuator is an electric motor.

* * * * *